(12) United States Patent
Sakai

(10) Patent No.: US 9,755,565 B2
(45) Date of Patent: Sep. 5, 2017

(54) MOTOR DRIVE DEVICE

(71) Applicant: DENSO CORPORATION, Kariya, Aichi-pref. (JP)

(72) Inventor: Koji Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 8 days.

(21) Appl. No.: 14/894,545

(22) PCT Filed: May 28, 2014

(86) PCT No.: PCT/JP2014/002810
§ 371 (c)(1),
(2) Date: Nov. 30, 2015

(87) PCT Pub. No.: WO2014/196162
PCT Pub. Date: Dec. 11, 2014

(65) Prior Publication Data
US 2016/0105138 A1    Apr. 14, 2016

(30) Foreign Application Priority Data

Jun. 3, 2013 (JP) .................................. 2013-117042

(51) Int. Cl.
*H02P 1/04* (2006.01)
*H02P 6/12* (2006.01)
*H02P 27/08* (2006.01)

(52) U.S. Cl.
CPC .................................. *H02P 27/085* (2013.01)

(58) Field of Classification Search
CPC ..... H02M 2001/0022; H02M 7/53875; H02M 5/458; H02M 7/48; H02M 2001/0025;
(Continued)

(56) References Cited

U.S. PATENT DOCUMENTS 5,442,271 A * 8/1995 Hatanaka .............. H02J 3/1892
318/729
5,463,299 A * 10/1995 Futami ...................... H02P 6/06
318/400.13
(Continued)

FOREIGN PATENT DOCUMENTS

JP    2004048885 A    2/2004
JP    2004289985 A    10/2004
(Continued)

OTHER PUBLICATIONS

International Search Report and Written Opinion (in Japanese with English Translation) for PCT/JP2014/002810, mailed Jul. 29, 2014; ISA/JP.

*Primary Examiner* — Paul Ip
(74) *Attorney, Agent, or Firm* — Harness, Dickey & Pierce, P.L.C.

(57) ABSTRACT

When a control device determines, based on a sampling number in one period of a target modulation factor waveform, that the sampling number is less than a predetermined value in a case where a two-phase modulation scheme is selected and the target rotation number increases, the control device switches a modulation scheme from the two-phase modulation scheme to a three-phase modulation scheme.

8 Claims, 7 Drawing Sheets

(58) Field of Classification Search
CPC .... H02M 5/293; H02M 5/297; H02M 5/4585; H02M 7/53873; H02M 1/126; H02M 1/4225; H02M 1/44; H02M 2001/0009; H02M 2001/007
USPC .............. 318/400.09, 400.13, 400.15, 800
See application file for complete search history.

(56) References Cited

U.S. PATENT DOCUMENTS

| | | | | | |
|---|---|---|---|---|---|
| 7,659,689 | B2* | 2/2010 | Yoshimoto | ............ | H02M 1/10 318/599 |
| 7,701,740 | B2* | 4/2010 | Yamanaka | ............ | H02M 5/293 363/149 |
| 7,986,117 | B2* | 7/2011 | Yamamoto | ............ | B60L 15/025 318/400.02 |
| 8,018,185 | B2* | 9/2011 | Yamamoto | ............ | B60L 15/025 318/400.02 |
| 8,045,345 | B2* | 10/2011 | Kono | ............ | H02M 7/48 363/34 |
| 8,193,743 | B2* | 6/2012 | Yamada | ............ | H02M 7/53875 318/162 |
| 8,222,857 | B2* | 7/2012 | Kitanaka | ............ | H02P 21/0021 318/400.26 |
| 8,232,753 | B2* | 7/2012 | Shimada | ............ | H02P 5/74 318/400.01 |
| 8,278,855 | B2* | 10/2012 | Kitanaka | ............ | H02P 27/08 318/400.22 |
| 8,279,641 | B2* | 10/2012 | Kawamoto | ............ | B60L 11/00 363/37 |
| 8,344,680 | B2* | 1/2013 | Kitanaka | ............ | H02P 21/06 318/400.01 |
| 8,373,380 | B2* | 2/2013 | Hayashi | ............ | H02P 21/0089 318/727 |
| 8,488,344 | B2* | 7/2013 | Kono | ............ | B60L 9/005 363/37 |
| 8,497,646 | B2* | 7/2013 | Yamada | ............ | H02P 21/0003 318/400.09 |
| 8,502,493 | B2* | 8/2013 | Suhama | ............ | H02P 27/04 318/727 |
| 8,531,148 | B2* | 9/2013 | Sumita | ............ | H02P 21/0003 318/490 |
| 8,639,405 | B2* | 1/2014 | Yamada | ............ | B60L 11/1803 180/65.285 |
| 8,704,482 | B2* | 4/2014 | Maruyama | ............ | H02M 1/12 318/599 |
| 2004/0207360 | A1* | 10/2004 | Matsushiro | ............ | B60H 1/00428 318/811 |
| 2007/0194746 | A1* | 8/2007 | Yoshimoto | ............ | B60L 11/1881 318/801 |
| 2007/0216338 | A1* | 9/2007 | Yoshimoto | ............ | H02M 1/10 318/800 |
| 2008/0297099 | A1* | 12/2008 | Maekawa | ............ | D06F 37/304 318/799 |
| 2009/0091954 | A1* | 4/2009 | Yamanaka | ............ | H02M 5/297 363/34 |
| 2009/0237021 | A1* | 9/2009 | Yamamoto | ............ | B60L 15/025 318/400.15 |
| 2009/0237022 | A1* | 9/2009 | Yamamoto | ............ | B60L 15/025 318/400.26 |
| 2010/0013421 | A1* | 1/2010 | Itoh | ............ | H02M 7/00 318/400.09 |
| 2010/0033996 | A1* | 2/2010 | Kono | ............ | H02M 7/48 363/37 |
| 2010/0128502 | A1* | 5/2010 | Kawamoto | ............ | B60L 11/00 363/34 |
| 2010/0134053 | A1* | 6/2010 | Yamada | ............ | H02M 7/53875 318/162 |
| 2010/0194330 | A1* | 8/2010 | Hayashi | ............ | H02P 27/08 318/799 |
| 2010/0259207 | A1* | 10/2010 | Kitanaka | ............ | H02P 21/06 318/400.17 |
| 2010/0308649 | A1* | 12/2010 | Kono | ............ | B60L 9/005 307/9.1 |
| 2011/0043149 | A1* | 2/2011 | Kitanaka | ............ | H02P 21/0021 318/400.26 |
| 2011/0062908 | A1* | 3/2011 | Kitanaka | ............ | H02P 21/22 318/400.22 |
| 2011/0080125 | A1* | 4/2011 | Shimada | ............ | H02P 5/74 318/400.09 |
| 2011/0080131 | A1* | 4/2011 | Shimada | ............ | H02P 27/04 318/503 |
| 2011/0187308 | A1* | 8/2011 | Suhama | ............ | H02P 27/04 318/798 |
| 2011/0241584 | A1* | 10/2011 | He | ............ | H02P 6/08 318/400.09 |
| 2011/0273125 | A1* | 11/2011 | Yamada | ............ | H02P 21/0003 318/503 |
| 2011/0298403 | A1* | 12/2011 | Yamamoto | ............ | B60L 15/025 318/400.02 |
| 2012/0001581 | A1* | 1/2012 | Sumita | ............ | H02P 21/0003 318/490 |
| 2012/0001586 | A1* | 1/2012 | Maruyama | ............ | H02M 5/4585 318/798 |
| 2012/0173066 | A1* | 7/2012 | Yamada | ............ | B60L 11/1803 701/22 |
| 2012/0187894 | A1 | 7/2012 | Higuchi et al. | | |
| 2014/0232318 | A1* | 8/2014 | Yokozutsumi | ........ | H02P 27/085 318/722 |
| 2015/0002058 | A1* | 1/2015 | Kashihara | ............ | H02P 27/085 318/400.3 |
| 2015/0015171 | A1* | 1/2015 | Nishibata | ............ | H02P 29/0038 318/400.15 |
| 2015/0016170 | A1* | 1/2015 | Olarescu | ............ | H02M 7/00 363/132 |

FOREIGN PATENT DOCUMENTS

| | | |
|---|---|---|
| JP | 2005027395 A | 1/2005 |
| JP | 2006217673 A | 8/2006 |
| JP | 2012110171 A | 6/2012 |
| WO | WO-2011002015 A1 | 1/2011 |

* cited by examiner

FIRST SIDE ←→ SECOND SIDE

MOTOR DRIVE DEVICE

CROSS REFERENCE TO RELATED APPLICATIONS

This application is a U.S. National Phase Application under 35 U.S.C. 371 of International Application No. PCT/JP2014/002810 filed on May 28, 2014 and published in Japanese as WO 2014/196162 A1 on Dec. 11, 2014. This application is based on and claims the benefit of priority from Japanese Patent Application No. 2013-117042 filed on Jun. 3, 2013. The entire disclosures of all of the above applications are incorporated herein by reference.

TECHNICAL FIELD

The present disclosure relates to a motor drive device driving a motor by using an inverter circuit.

BACKGROUND ART

Conventionally, a motor drive device PWM-modulates a DC voltage into AC by the switching of switching elements of an inverter circuit, outputs the voltage to a motor coil of three phases, and thereby drives a position-sensorless three-phase motor. In such a motor drive device, it is known that a modulation scheme for PWM modulation is selectively switched between a three-phase modulation scheme and another modulation scheme of fixing the on/off states of switching elements of at least one phase.

For example, in a motor control device disclosed in the following Patent Literature 1, a 180-degree sine wave drive scheme is applied during motor start-up and in a low-speed rotation region, and a 120-degree conduction rectangular wave drive scheme is applied in a high-speed rotation region.

PRIOR ART LITERATURES

Patent Literature

Patent Literature 1: JP 2005-27395 A

However, in the above-described conventional motor drive device, when a modulation scheme other than the three-phase modulation scheme is applied and higher-speed rotation control is performed, it is possible that the motor cannot be stably driven in the case of relatively large load fluctuations or the like. In the case of applying the other modulation scheme and performing higher-speed rotation control, when a sampling period from the target modulation factor waveform (theoretical modulation factor waveform) of the other modulation scheme is not reduced, a modulation factor waveform for control deviates from the target modulation factor waveform, which leads to the instability of the motor drive.

On the other hand, an improvement in the processing frequency of a microcomputer, a higher frequency of the switching operation, etc. can resolve the above matter. However, it is necessary to improve hardware performance.

SUMMARY OF INVENTION

It is an object of the present disclosure to provide a motor drive device that can stably drive the motor without improving hardware performance during higher-speed rotation drive.

According to an aspect of the present disclosure, the motor driving device includes an inverter circuit that has a switching element provided corresponding to each phase of a motor having a motor coil of three phases, converts a DC voltage into an AC voltage by a PWM modulation associated with a switching operation of the switching element, and outputs the AC voltage to the motor coil of each phase, and a control device that controls the PWM modulation of the inverter circuit based on a control modulation factor value sampled at a predetermined period from a target modulation factor waveform determined in accordance with a target rotation number of the motor, and can selectively switch a scheme of the PWM modulation between a plurality of modulation schemes including a three-phase modulation scheme. When the control device determines, based on the sampling number in one period of the target modulation factor waveform or a correlation value of the sampling number, that the sampling number is less than a predetermined value in a case where a modulation scheme other than the three-phase modulation scheme is selected and the target rotation number increases, the control device switches the scheme of the PWM modulation from the other modulation scheme to the three-phase modulation scheme.

Thus, when the magnification of the sampling frequency with respect to the target modulation factor waveform frequency becomes less than the predetermined value at the time of increasing the motor rotation number in the other modulation scheme, the control device switches the PWM modulation scheme from the other modulation scheme to the three-phase modulation scheme. That is, when the control modulation factor value sampling number in one period from the target modulation factor waveform becomes less than the predetermined value at the time of increasing the rotation number in the other modulation scheme, the control device changes the modulation scheme from the other modulation scheme to the three-phase modulation scheme. Therefore, when the control modulation factor value sampling number in one period decreases so that a control modulation factor waveform formed by sampling values deviates from the target modulation factor waveform, it is possible to adopt the three-phase modulation scheme which facilitates approximation to the target modulation factor waveform, even with a small sampling number. This enables relative stable higher-speed rotation of the motor by switching the modulation scheme from the other modulation scheme to the three-phase modulation scheme without improving hardware performance such as the processing frequency of the control device. Thus, it is possible to stably drive the synchronous motor without improving hardware performance during higher-speed rotation drive.

BRIEF DESCRIPTION OF DRAWINGS

The above and other objects and advantages of the present disclosure will be more readily apparent from the following detailed description made with reference to the accompanying drawings. In the drawings.

DESCRIPTION OF EMBODIMENTS

Figure 1:
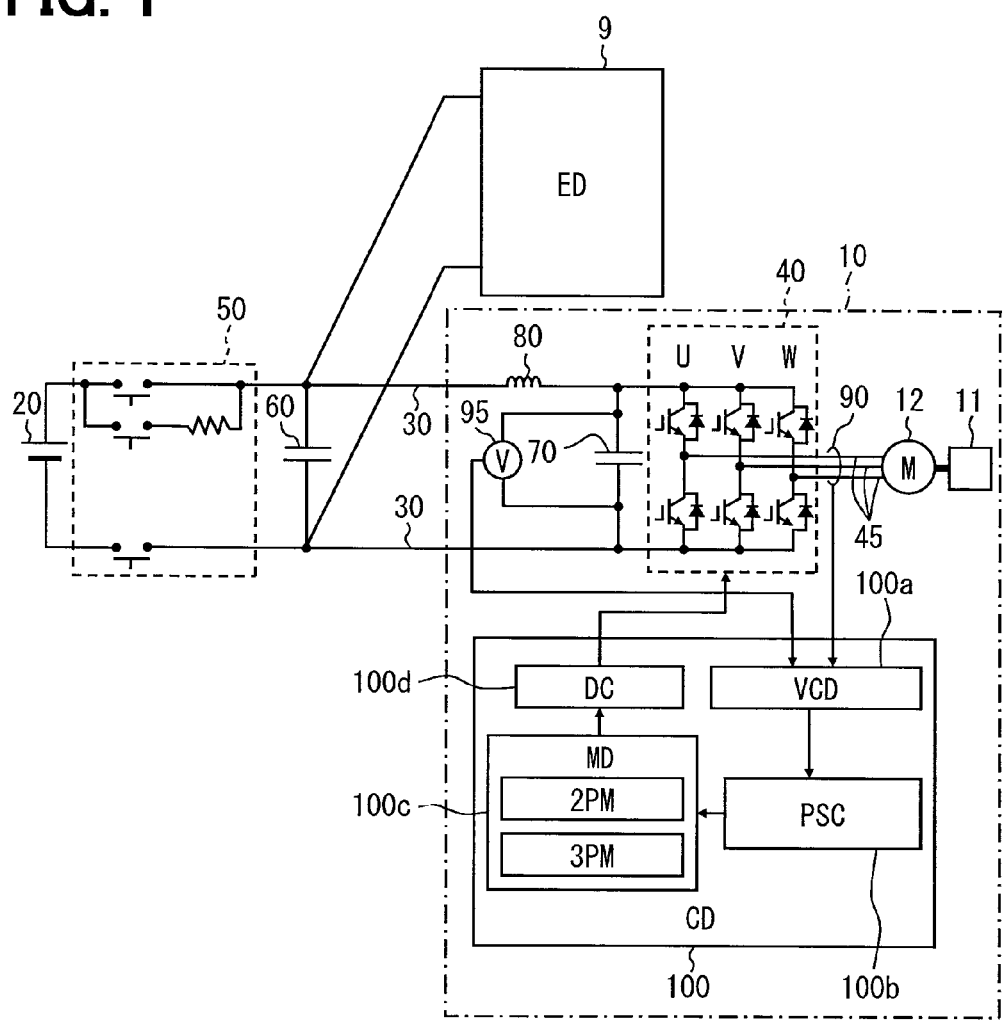
FIG. 1 is a circuit and partial block diagram of a motor drive device according to a first embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

[First Embodiment]

A first embodiment of the present disclosure will be described with reference to FIGS. 1 to 6.

As shown in FIG. 1, a motor drive device according to this embodiment drives a synchronous motor 12 of an electric compressor 10. According to this embodiment, the synchronous motor 12 corresponds to a motor. The electric compressor 10 is a compressor disposed in the heat pump cycle of a vehicle air conditioner with, for example, carbon dioxide as a refrigerant, and the synchronous motor 12 that is arranged in the electric compressor 10 drives a compression mechanism 11 as a load. The electric compressor 10 is an electric compressor in which the compression mechanism 11 compresses and discharges a vapor refrigerant. For example, the electric compressor 10 compresses a carbon dioxide refrigerant to a critical pressure and discharges it. The synchronous motor 12 according to this embodiment is, for example, a synchronous motor having a four-pole three-phase coil for rotationally driving a rotor in which a magnet is embedded.

A DC power source 20 shown in FIG. 1 is a DC voltage supply source including a high-voltage battery capable of outputting a voltage of, for example, 288 V. A high-voltage relay system 50 is disposed in a pair of buses 30 extending from the DC power source 20 to an inverter circuit 40. The high-voltage relay system 50 includes a plurality of relays and a resistor. The high-voltage relay system 50 has the function of preventing an inrush current from flowing through the buses 30 by switching between a path with the resistor at the time of application of the high voltage and a path without the resistor after the start of the voltage application.

Further, the high-voltage relay system 50 cuts off the feed path at the time of detecting an abnormality in the electric compressor 10 or the like.

As shown in FIG. 1, capacitors 60, 70 as a smoothing unit are located between the pair of buses 30 which are power supply paths from the DC power source 20 to the inverter circuit 40. The capacitor 60 is provided to smooth the voltage that fluctuates under the influence of an electric device (ED) 9 connected in parallel with the inverter circuit 40 between the buses 30. The electric device 9 is, for example, a motor drive device for vehicle travel, a charging device, and a step-down DC/DC conversion device.

For example, in the case where the vehicle incorporates a plurality of motor drive devices and the electric device 9 is the motor drive device for vehicle travel, among motor drive devices supplied with electric power from the DC power source 20, the electric device 9 is a main drive device, and the drive device including the inverter circuit 40 is a subordinate drive device. For example, the main drive device is supplied with larger input power from the DC power source 20 than the subordinate drive device. Further, the main drive device might be supplied with electric power on a priority basis when it is difficult to supply electric power to both the drive devices.

In the case where the input power to the electric device 9 is, for example, ten times or more larger than the input power to the electric compressor 10 through the inverter circuit 40, the voltage applied to the inverter circuit 40 through the buses 30 from the DC power source 20 easily fluctuates greatly under the influence of the electric device 9. The capacitor 60 is provided to suppress the voltage fluctuation.

The capacitor 70 is provided to absorb surges and ripples occurring with the switching of switching elements of the inverter circuit 40.

A coil 80 is disposed between a connection point of the capacitor 60 and a connection point of the capacitor 70 on one bus 30. The coil 80 is provided to suppress interference between the two capacitors 60 and 70 provided in parallel between the buses 30. The coil 80 is provided, for example, in order to change a resonance frequency generated by the relationship between the capacitors 60 and 70. The capacitor 70 and the coil 80 constitute an LC filter circuit.

The inverter circuit 40 includes arms of three phases of a U phase, a V phase, and a W phase which correspond to the stator coil of the synchronous motor 12, and converts the DC voltage inputted through the buses 30 into AC by PWM modulation, and outputs it.

The U-phase arm is configured by series-connecting an upper arm having a switching element and a flywheel diode connected in anti-parallel and a lower arm having a switching element and a diode connected in anti-parallel. In the U-phase arm, an output line 45 extending from the junction of the upper and lower arms is connected to a motor coil. The V-phase arm and the W-phase arm are configured with switching elements and diodes in the same way, and each output line 45 extending from the junction of the upper and lower arms is connected to the motor coil. In this embodiment, the upper arm is a circuit connected to the positive side of the DC power source 20, and the lower arm is a circuit connected to the negative side of the DC power source 20.

The switching element can be, for example, an insulated gate bipolar transistor (IGBT) or the like. Further, the arm including the switching element and the diode may be a switching element such as a reverse conducting insulated gate bipolar transistor (RCIGBT) which is a power semiconductor formed by integrating the IGBT and a reverse conducting diode into a single chip.

The output lines 45 are provided with a current detection device 90 for detecting current flowing through the output lines 45 of one or more phases. A current transformer scheme, a Hall element scheme, or a shunt resistor scheme can be adopted for the current detection device 90. The current detection device 90 outputs the detected current information to a control device (CD) 100.

A voltage detection device 95 for detecting the voltage between the buses 30 at the connection part of the capacitor 70 is provided between the buses 30. A resistive voltage division scheme or the like can be adopted for the voltage detection device 95. The voltage detection device 95 outputs the detected voltage information to the control device 100.

The control device 100 as a control unit controls the switching operation of each switching element of the inverter circuit 40 to control the drive of the synchronous motor 12. The control device 100 receives motor coil current value information and the like, and based thereon, the control device 100 generates a PWM wave as a switching signal and outputs it to the inverter circuit 40.

The control device 100 is comprised of, for example, a microcomputer or a dedicated IC, in terms of hardware. The control device 100 has a voltage/current detection unit (VCD) 100a, a position sensorless control unit (PSC) 100b, a modulation scheme determination unit (MD) 100c, and a drive circuit unit (DC) 100d.

The voltage/current detection unit 100a receives the current information signal from the current detection device 90 and the voltage information signal from the voltage detection device 95, and converts the signals into a state quantity (physical quantity) used for control computation. The position sensorless control unit 100b receives a compressor rotation number command from a higher-level control device (for example, air-conditioning control device) and the state quantity from the voltage/current detection unit 100a, and outputs control information for implementing motor rotation speed-current control in a position sensorless manner. The compressor rotation number command corresponds to a target rotation number of the motor.

The modulation scheme determination unit 100c receives the control information from the position sensorless control unit 100b, and determines a modulation scheme to be adopted among a plurality of modulation schemes in accordance with a motor rotation number or a modulation factor sampling number. The plurality of modulation schemes are a two-phase modulation scheme (2PM) and a three-phase modulation scheme (3PM) in this example. The two-phase modulation scheme in this example is a two-phase modulation scheme with the upper and lower fixation in which the on/off states of the switching elements of the three-phase arms are sequentially fixed to the upper arm side and the lower arm side alternately by 60 degrees in electrical angle.

The modulation scheme determination unit 100c calculates a modulation signal based on the determined modulation scheme, and outputs the modulation signal to the drive circuit unit 100d. The drive circuit unit 100d includes components for generating a drive signal for operating the inverter circuit 40. The drive circuit unit 100d receives the modulation signal from the modulation scheme determination unit 100c, and outputs a pulsed drive signal (PWM wave signal) to the inverter circuit 40.

The electric compressor 10 is disposed, for example, in the engine room of an automobile. The electric compressor 10, together with a radiator, a decompressor, and an evaporator, constitutes a refrigeration cycle device for a vehicle air conditioner.

Figure 2:
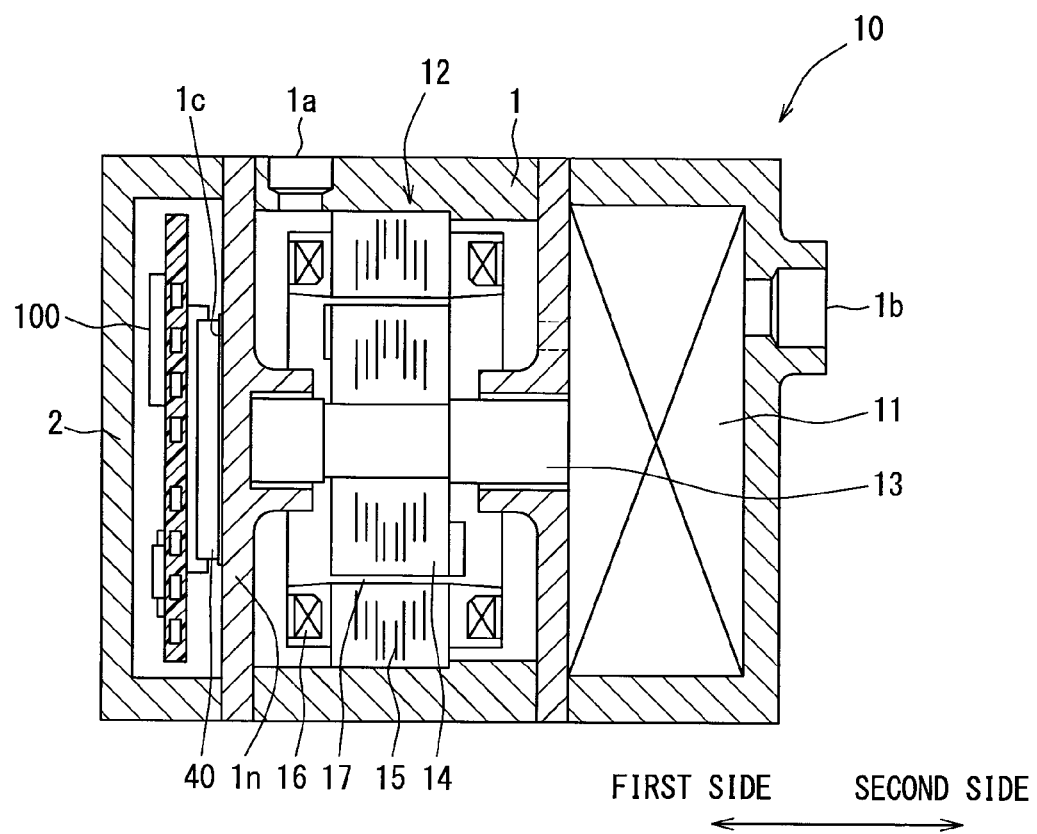
FIG. 2 is a sectional view showing the schematic structure of an electric compressor.

As shown in FIG. 2, the electric compressor 10 includes a housing 1. The housing 1 is made of metal such as aluminum or aluminum alloy with high heat conductivity, and substantially shaped like a cylinder. The housing 1 is provided with a refrigerant suction port 1a and a refrigerant discharge port 1b.

The refrigerant suction port 1a is disposed on the first side in an axial direction in the housing 1. The refrigerant suction port 1a is formed so as to pass through the cylindrical portion of the housing 1 in a radial direction. A refrigerant from the refrigerant outlet of the evaporator flows into the refrigerant suction port 1a. The refrigerant discharge port 1b is disposed on the second side in the axial direction in the housing 1. The refrigerant is discharged through the refrigerant discharge port 1b toward the refrigerant inlet of the radiator.

The electric compressor 10 includes the compression mechanism 11, the synchronous motor 12, the inverter circuit 40, an inverter cover 2, and the like. The synchronous motor 12 includes a rotating shaft 13, a rotor 14, a stator core 15, a stator coil 16 (corresponding to the motor coil), and the like.

The rotating shaft 13 is disposed within the housing 1. The axial direction of the rotating shaft 13 coincides with the axial direction of the housing 1. The rotating shaft 13 is rotatably supported by two bearings. The rotating shaft 13 transmits a rotation driving force received from the rotor 14 to the compression mechanism 11. The bearings are supported by the housing 1.

The rotor 14 has, for example, a permanent magnet embedded therein. The rotor 14 is shaped like a cylinder and fixed to the rotating shaft 13. The rotor 14 rotates along with the rotating shaft 13, based on a rotating magnetic field generated from the stator core 15.

The stator core 15 is disposed outside the rotor 14 in the radial direction within the housing 1. The stator core 15 is shaped like a cylinder whose axial direction coincides with the axial direction of the rotating shaft 13. A gap is formed between the stator core 15 and the rotor 14. The gap forms a refrigerant flow path 17 for passing the refrigerant in the axial direction of the rotating shaft 13.

The stator core 15 is made of a magnetic material, and supported on the inner surface of the housing 1. The stator coil 16 is wound around the stator core 15. The stator coil 16 generates a rotating magnetic field.

The compression mechanism 11 is disposed on the second side in the axial direction with respect to the synchronous motor 12. The compression mechanism 11 is, for example, a scroll-type compressor including a fixed scroll and a movable scroll. The compression mechanism 11 revolves the movable scroll by the rotation driving force from the rotating shaft 13 of the synchronous motor 12 to suction, compress, and discharge the refrigerant. The compression mechanism 11 is not limited to the scroll type, and may be, for example, a rotary type having a vane.

The inverter circuit 40 is mounted on a mounting surface 1c of the housing 1. More specifically, for example, the inverter circuit 40 is disposed so that a package unit including a plurality of switching elements is crimped on the mounting surface 1c through an electrically insulating heat dissipation sheet. The mounting surface 1c is formed on the outer surface of a wall portion 1n disposed on the first side in the axial direction of the housing 1.

The inverter circuit 40 constitutes a drive circuit for generating three-phase voltage for driving the synchronous motor 12. The inverter cover 2 is made of, for example, metal or resin, and formed so as to cover the inverter circuit 40. The inverter cover 2 is fastened to the housing 1 with screws (not shown).

The electric compressor 10 shown in FIG. 2 includes the configuration enclosed by a dashed-dotted line shown in FIG. 1, and the control device 100, etc. are also disposed in the mounting room of the inverter circuit 40 shown in FIG. 2.

When three-phase drive current flows through the stator coil 16 of the synchronous motor 12 shown in FIG. 2, a rotating magnetic field is generated by the stator core 15, so that a rotation driving force to the rotor 14 is generated. Accordingly, the rotor 14 rotates along with the rotating shaft 13. The compression mechanism 11 revolves by the rotation driving force from the rotating shaft 13 and suctions the refrigerant.

At this time, the low pressure and low temperature refrigerant suctioned from the evaporator flows into the housing 1 through the refrigerant suction port 1a. Then, the suctioned refrigerant flows along the wall portion 1n, and passes through the refrigerant flow path 17 to the compression mechanism 11. The refrigerant flows within the housing 1 so as to revolve around the axis by the rotation of the rotor 14. The suctioned refrigerant is compressed by the compression mechanism 11, and discharged through the refrigerant discharge port 1b to the radiator. As the rotation number of the synchronous motor 12 increases, the electric compressor 10 increases the refrigerant amount suctioned, compressed, and discharged by the compression mechanism 11.

The inverter circuit 40 generates heat along with the operation. The heat generated by the inverter circuit 40 is conducted through the wall portion 1n of the housing 1 to the suctioned refrigerant flowing along the wall portion 1n.

At this time, the stator coil 16 generates heat by the passage of three-phase drive current. The heat generated by the stator coil 16 is conducted through the stator core 15 to the suctioned refrigerant in the refrigerant flow path 17. This makes it possible to cool the stator core 15 and the stator coil 16 by the suctioned refrigerant. To cool the stator core 15 and the stator coil 16, a refrigerant flow path may be formed in a part between the housing 1 and the stator core 15.

Next, the modulation scheme selection control operation of the control device 100 will be described with reference to FIG. 3. First, when the electric compressor 10 is supplied with electric power for rotational drive, in 110 the control device 100 acquires a rotation number command for the electric compressor 10 corresponding to the target rotation number of the synchronous motor 12 from a higher-level control device. Then, in 120, the control device 100 calculates an electrical angle frequency for driving the synchronous motor 12 based on the acquired rotation number command. More specifically, in 120, the control device 100 calculates the frequency of a target modulation factor waveform determined based on the rotation number command value, etc.

In 130, the control device 100 calculates a sampling number of modulation factor values for control from the target modulation factor waveform in one period of the electrical angle. That is, in 130, the control device 100 calculates the magnification of a sampling frequency with respect to the electrical angle frequency. In this embodiment, the sampling frequency is 20 kHz. In 140, the control device 100 determines whether or not the sampling number calculated in 130 is less than a predetermined value. In this embodiment, the predetermined value is 18.

In 140 when the control device 100 determines that the sampling number is not less than the predetermined value, the flow proceeds to 150 where the control device 100 selects the two-phase modulation scheme as a modulation scheme for PWM modulation performed by the inverter circuit 40. In 140 when the control device 100 determines that the sampling number is less than the predetermined value, the flow proceeds to 160 where the control device 100 selects the three-phase modulation scheme as a modulation scheme for PWM modulation performed by the inverter circuit 40. After the control device 100 selects the modulation scheme for PWM modulation by executing 150 or 160, the flow returns to 110.

Figure 3:
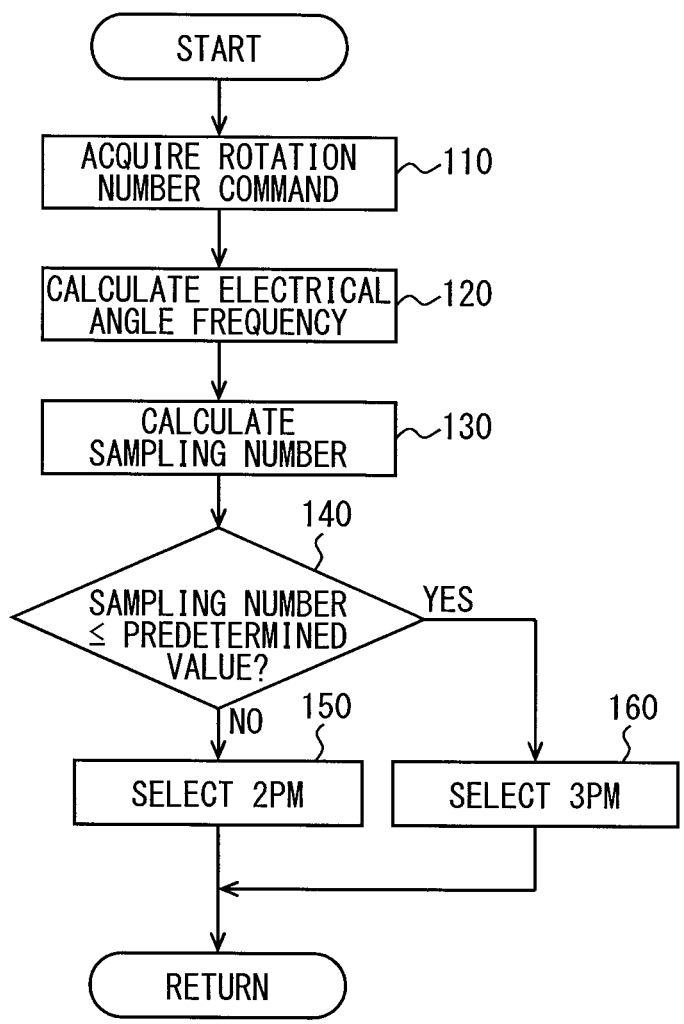
FIG. 3 is a flowchart showing the outline control operation of a control device.

The control flow shown in FIG. 3 is periodically repeatedly executed. The period of repetitive execution of the control operation can be the period of input of the rotation number command from the higher-level control device, the internal speed control period of the control device 100, a current control period, or the like. The period of repetitive execution is preferably a control period that affects the sampling number in one period of the electrical angle (a control period that can change the sampling number).

Although not shown in FIG. 3, the control device 100 selects the three-phase modulation scheme as the PWM modulation scheme during low-speed rotation when the rotation number command value is relatively small, for example, immediately after the start-up of the synchronous motor 12. When the rotation number command value increases and medium-speed rotation to relatively high-speed rotation is required, the control device 100 selects the two-phase modulation scheme which can relax voltage saturation and reduce switching loss. Then, when the rotation number command value further increases and higher-speed rotation, i.e., ultrahigh-speed rotation is required, the control device 100 selects the three-phase modulation scheme based on the sampling number in one period of the electrical angle.

According to the above configuration and operation, the control device 100 can selectively switch the PWM modulation scheme in the inverter circuit 40 between the two-phase modulation scheme and the three-phase modulation scheme. When the control device 100 determines that the magnification of the sampling frequency with respect to the electrical angle frequency is less than the predetermined value in a case where the rotation number command value from the higher-level control device increases while the two-phase modulation scheme is selected, the control device 100 switches the PWM modulation scheme from the two-phase modulation scheme to the three-phase modulation scheme.

Thus, when the magnification of the sampling frequency with respect to the target modulation factor waveform frequency becomes less than the predetermined value at the time of increasing the motor rotation number in the two-phase modulation scheme, the control device 100 switches the PWM modulation scheme from the two-phase modulation scheme to the three-phase modulation scheme. That is, when the control modulation factor value sampling number in one period from the target modulation factor waveform becomes less than the predetermined value at the time of increasing the rotation number in the two-phase modulation scheme, the control device 100 changes the modulation scheme from the two-phase modulation scheme to the three-phase modulation scheme.

Therefore, when the control modulation factor value sampling number in one period decreases so that a control modulation factor waveform formed by sampling values deviates from the target modulation factor waveform, it is possible to adopt the three-phase modulation scheme which facilitates approximation to the target modulation factor waveform, even with a small sampling number. This enables relative stable higher-speed rotation of the motor by switching the modulation scheme from the two-phase modulation scheme to the three-phase modulation scheme without improving hardware performance such as the processing frequency of the control device 100. Thus, it is possible to stably drive the synchronous motor 12 without improving hardware performance during higher-speed rotation drive.

Figure 4:
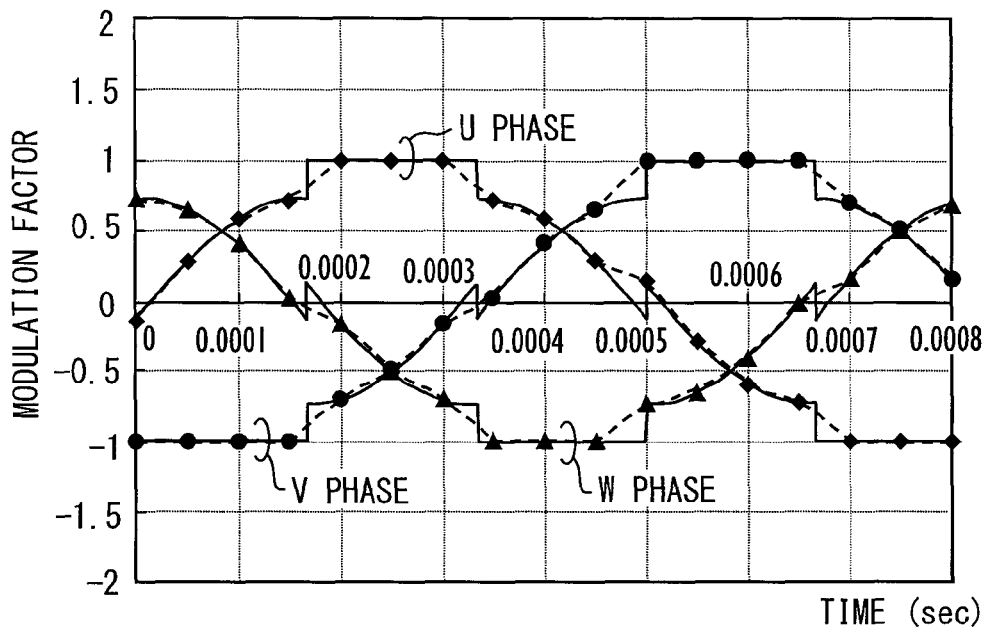
FIG. 4 is a graph showing an example of a target modulation factor waveform and a sampled waveform when a two-phase modulation scheme is selected.

As shown in FIG. 4, in the case where the electrical angle frequency is 1 kHz and the sampling frequency is 20 kHz, the sampling number in one period of the electrical angle is 20. In this embodiment, a mechanical angle frequency is 500 Hz. As shown in FIG. 4, a sampling waveform indicated by a broken line relatively matches a theoretical waveform (theoretical modulation factor waveform, target modulation factor waveform) of the two-phase modulation indicated by a solid line.

Figure 5:
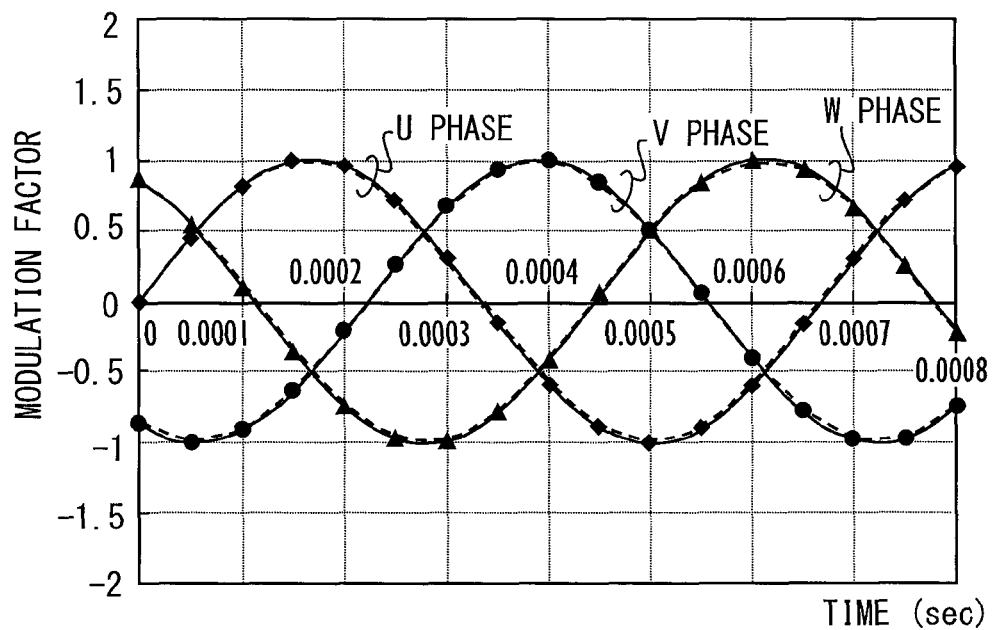
FIG. 5 is a graph showing an example of a target modulation factor waveform and a sampled waveform in the case of switching to a three-phase modulation scheme when a target rotation number increases from the state in FIG. 4.

As shown in FIG. 5, in the case where the electrical angle frequency is 1.5 kHz and the sampling frequency is 20 kHz, the sampling number in one period of the electrical angle is 13.3. As shown in FIG. 5, the sampling waveform indicated by the broken line extremely matches the theoretical waveform (theoretical modulation factor waveform, target modulation factor waveform) of the three-phase modulation indicated by the solid line.

When the sampling number in one period of the electrical angle is equal to or more than 18, the theoretical waveform reproducibility of the sampling waveform is equal to or more than 66%. When the theoretical waveform reproducibility is equal to or more than 66%, a deviation from the theoretical waveform is small, which enables stable ultrahigh-speed rotation drive of the synchronous motor 12. In this embodiment, the ultrahigh-speed rotation drive is higher-speed rotation drive compared to the case shown in FIG. 4.

Figure 6:
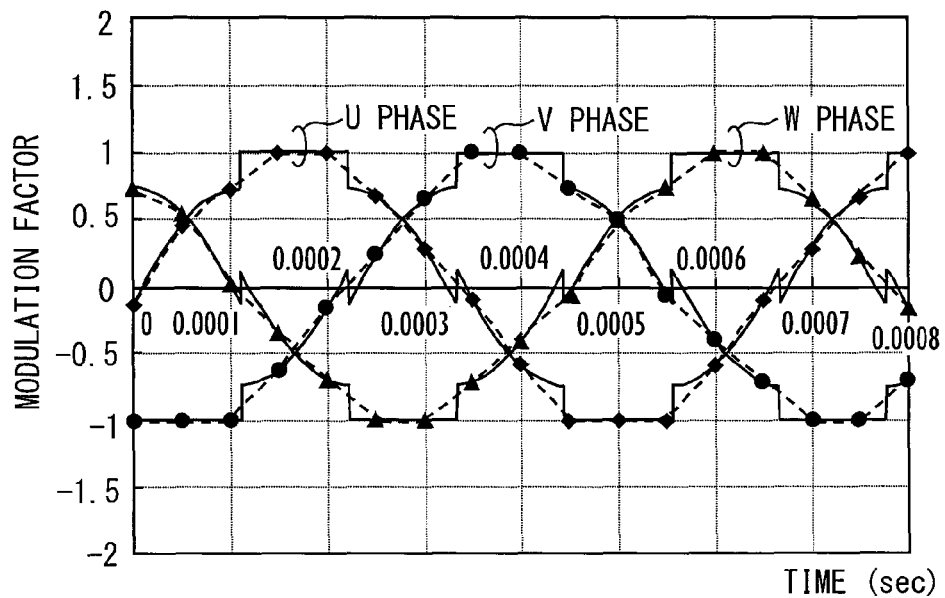
FIG. 6 is a graph showing a comparison example of a target modulation factor waveform and a sampled waveform when the two-phase modulation scheme is selected with the same target rotation number as in FIG. 4.

As shown in FIG. 6, in the case where the electrical angle frequency is 1.5 kHz and the sampling frequency is 20 kHz, the sampling number in one period of the electrical angle is 13.3 as in FIG. 5. As shown in FIG. 6, the sampling waveform indicated by the broken line deviates largely from the theoretical waveform (theoretical modulation factor waveform, target modulation factor waveform) of the two-phase modulation indicated by the solid line, and the theoretical waveform reproducibility of the sampling waveform is equal to or less than 50% for example. In the comparison example shown in FIG. 6, even though the two-phase modulation is adopted, the electrical angle in the state of fixing the switching element might be extremely smaller than 60 degrees. When the sampling waveform deviates largely from the theoretical waveform, it is difficult to perform accurate rotation drive control of the synchronous motor 12 based on the theoretical waveform and the information detected by the current detection device 90.

When the sampling number in one period of the electrical angle is increased by improving the hardware performance of the control device 100, it is possible to improve the theoretical waveform reproducibility of the sampling waveform even in an ultrahigh-speed rotation region. However, a higher sampling frequency easily causes a cost increase and also causes an increase in switching loss and the like. This loses the effect of using the two-phase modulation for relaxing voltage saturation and reducing switching loss as one purpose.

In this embodiment, the three-phase modulation scheme is used in a low-speed rotation region immediately after start-up, and the two-phase modulation scheme is selected in a medium-speed rotation region to a high-speed rotation region. Further, in the ultrahigh-speed rotation region where higher-speed rotation is required, the three-phase modulation scheme is selected, and priority is given to the improvement of the theoretical waveform reproducibility over the relaxation of voltage saturation.

This enables stable ultrahigh-speed rotation in driving the electric compressor 10 that has relatively large load fluctuations and is position-sensorless. It is possible to achieve ultrahigh-speed rotation of, for example, 1.5 kHz exceeding 1.11 kHz in electrical angle by PWM control with a sampling frequency of 20 kHz without improving hardware performance. Therefore, even with the electric compressor 10 that is relatively small, by dealing with the ultrahigh-speed rotation while suppressing increases in the size and cost of the inverter circuit 40 and the control device 100, it is possible to obtain high refrigerant compression discharge performance.

In this example, when the sampling number in one period of the electrical angle is less than 18, the PWM modulation scheme is switched from the two-phase modulation scheme to the three-phase modulation scheme; however, the sampling number as a criterion is not limited to 18. For example, the sampling number as the criterion may be 20. It is possible to achieve ultrahigh-speed rotation exceeding 1 kHz in electrical angle by PWM control with a sampling frequency of 20 kHz without improving hardware performance. The rotation exceeding 1 kHz in electrical angle frequency can be said to be higher-speed rotation, i.e., ultrahigh-speed rotation.

It is also possible to deal with the ultrahigh-speed rotation, using the three-phase modulation scheme in all regions from the low-speed rotation region immediately after start-up to the above-described ultrahigh-speed rotation region. However, according to this embodiment, it is possible to reduce switching loss by using the two-phase modulation scheme in the medium-speed rotation region and the high-speed rotation region between the low-speed rotation region and the ultrahigh-speed rotation region.

The load driven by the synchronous motor 12 is the compression mechanism 11 which suctions and compresses the refrigerant of the refrigeration cycle. The inverter circuit 40 is cooled by the refrigerant suctioned by the compression mechanism 11.

By switching the PWM modulation scheme from the two-phase modulation scheme to the three-phase modulation scheme for the stable high-speed rotation drive of the synchronous motor 12, the switching loss of the switching element increases and the amount of heat generation from the inverter circuit 40 increases. On the other hand, the inverter circuit 40 is cooled by the refrigerant suctioned by the compression mechanism 11. As the motor rotation number increases, the flow rate of the suctioned refrigerant increases, which enhances the capacity of the suctioned refrigerant to cool the inverter circuit 40. Therefore, even though the amount of heat generation increases by switching the modulation scheme for the higher-speed rotation drive, it is possible to cool the inverter circuit 40 with reliability, due to the enhancement of the cooling capacity of the suctioned refrigerant with the increase in the motor rotation number.

[Other Embodiments]

While the preferred embodiment of the present disclosure has been described, the present disclosure is not limited to the above embodiment, and various changes and modifications can be made without departing from the scope and spirit of the present disclosure.

In the above embodiment, when the control device 100 determines that the sampling number in one period of the electrical angle is less than the predetermined value in a case where the target rotation number increases, the control device 100 switches the PWM modulation scheme from the two-phase modulation scheme to the three-phase modulation scheme. The switching of the PWM modulation scheme is not limited to the switching based on the sampling number in one period of the electrical angle, that is, the magnification of the sampling frequency with respect to the target modulation factor waveform frequency, and may be switching based on a correlation value of the magnification of the sampling frequency with respect to the target modulation factor waveform frequency.

It is possible to use a pause duration (fixation duration of each phase arm) in the two-phase modulation as an example of the correlation value of the magnification of the sampling frequency with respect to the target modulation factor waveform frequency. In the two-phase modulation with the upper and lower fixation, a pause duration Ts calculated from the target rotation number is expressed by the following equation 1.

$$Ts = 1/(N \times Pn \times 6) \quad \text{(Equation 1)}$$

where N is the motor target rotation number (Hz), and Pn is the number of pole pairs of the rotor. In this embodiment, the number Pn of pole pairs is 2.

Assume that Tr is an actual output pause duration with respect to the pause duration Ts calculated by the equation 1. When Tr/Ts becomes less than a predetermined value, the modulation scheme can be switched from the two-phase modulation scheme to the three-phase modulation scheme. Since the theoretical waveform reproducibility of the sampling waveform is determined based on the sampling number in one period of the electrical angle as described above, when Tr/Ts relating to the theoretical waveform reproducibility is less than 66%, preferably the modulation scheme is switched from the two-phase modulation scheme to the three-phase modulation scheme. Alternatively, in consideration of a margin, the modulation scheme may be switched from the two-phase modulation scheme to the three-phase modulation scheme when Tr/Ts is less than 70%.

It is possible to use a waveform generation rate, that is, the theoretical waveform reproducibility as another example of the correlation value of the magnification of the sampling frequency with respect to the target modulation factor waveform frequency. For example, letting Vi be the theoretical waveform and Vr be an actual waveform (for example, command value to the inverter circuit), an evaluation function J of the waveform generation rate is expressed by the following equation 2.

$$J = \sum_{k=1}^{n} |Vi(k) - Vr(k)|^2 \quad \text{(Equation 2)}$$

When the value of the evaluation function J becomes more than a predetermined value, the waveform generation rate decreases so that a deviation from the theoretical waveform becomes large, and the modulation scheme can be switched from the two-phase modulation scheme to the three-phase modulation scheme. The threshold value of the evaluation function J can be a value corresponding to a waveform generation rate of 66%. Alternatively, in consideration of a margin, the threshold value of the evaluation function J may be a value corresponding to a waveform generation rate of 70%.

Figure 7:
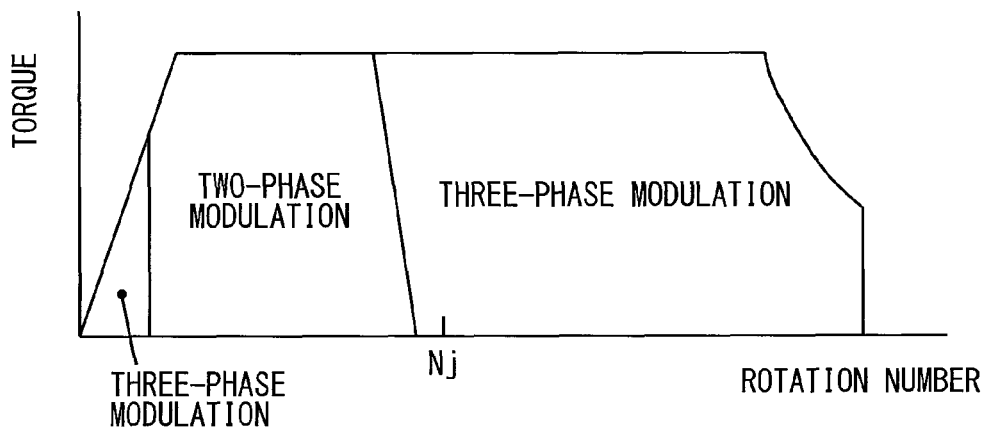
FIG. 7 is a graph showing an example of switching a modulation scheme in another embodiment.

The motor rotation number (i.e., the rotation number command value) or the modulation factor may be used as another example of the correlation value of the magnification of the sampling frequency with respect to the target modulation factor waveform frequency. Thus, it is possible to simplify the computation. In the case of switching the modulation scheme in accordance with the value of the modulation factor, the modulation scheme is switched in accordance with the rotation number and torque as illustrated by a map in FIG. 7. Since the modulation factor is a variable affected by the torque besides the rotation number and the sampling number, the modulation scheme is switched as shown in FIG. 7. In the case of switching the modulation scheme in accordance with the value of the motor rotation number, it is possible to switch between the two-phase modulation scheme and the three-phase modulation scheme, for example, using a threshold value Nj shown in FIG. 7.

While in the above embodiment the control device 100 selectively switches the PWM modulation scheme between the two-phase modulation scheme with the upper and lower fixation and the three-phase modulation scheme, the switching of the PWM modulation scheme is not limited thereto. The PWM modulation scheme may be selectively switched between a plurality of modulation schemes including the three-phase modulation scheme.

When the control device determines that the magnification of the sampling frequency with respect to the target modulation factor waveform frequency is less than the predetermined value in a case where a modulation scheme other than the three-phase modulation scheme is selected and the target rotation number increases, the PWM modulation scheme may be switched from the other modulation scheme to the three-phase modulation scheme.

Figure 8:
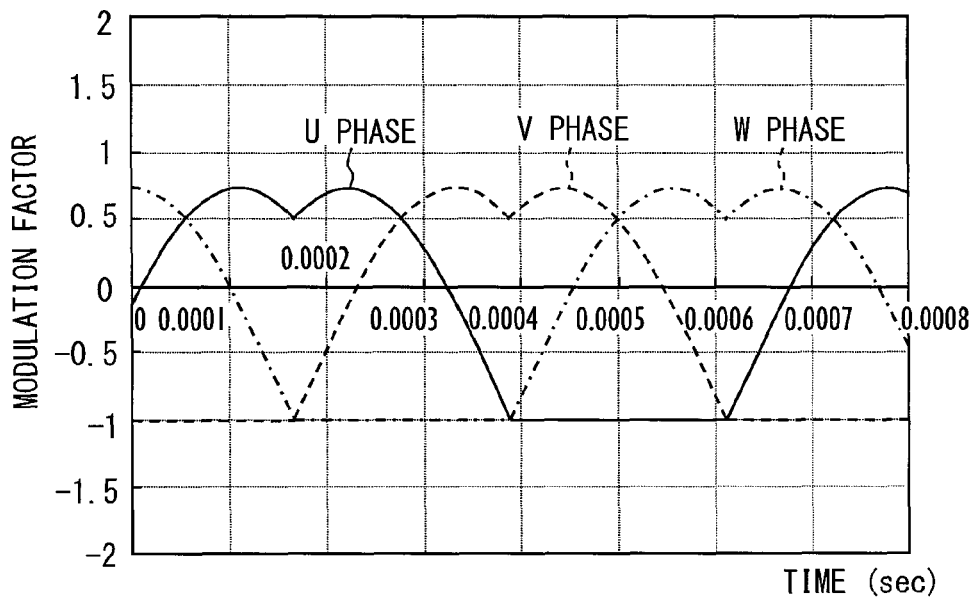
FIG. 8 is a graph showing an example of a modulation scheme other than the three-phase modulation scheme in another embodiment.
Figure 9:
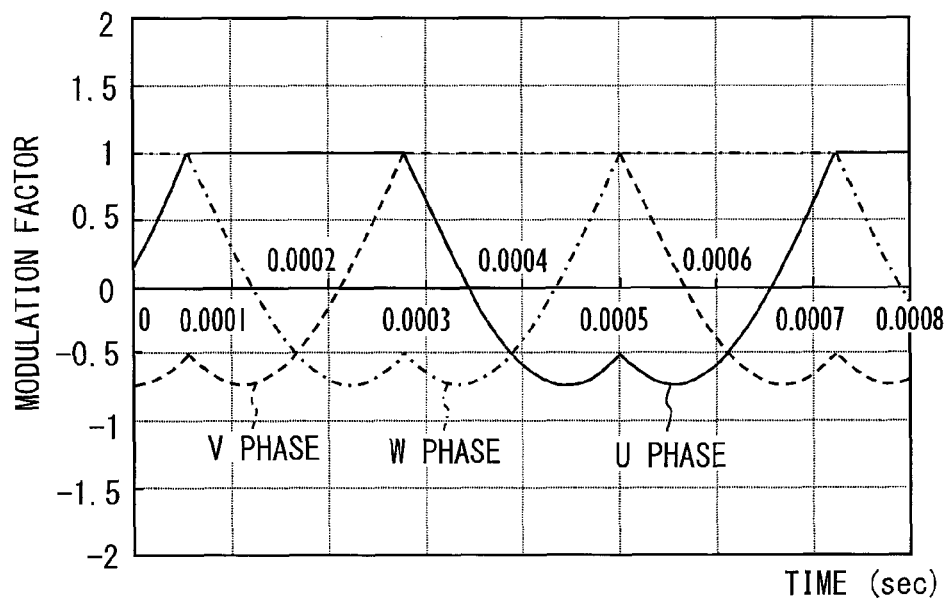
FIG. 9 is a graph showing another example of a modulation scheme other than the three-phase modulation scheme in another embodiment.
Figure 10:
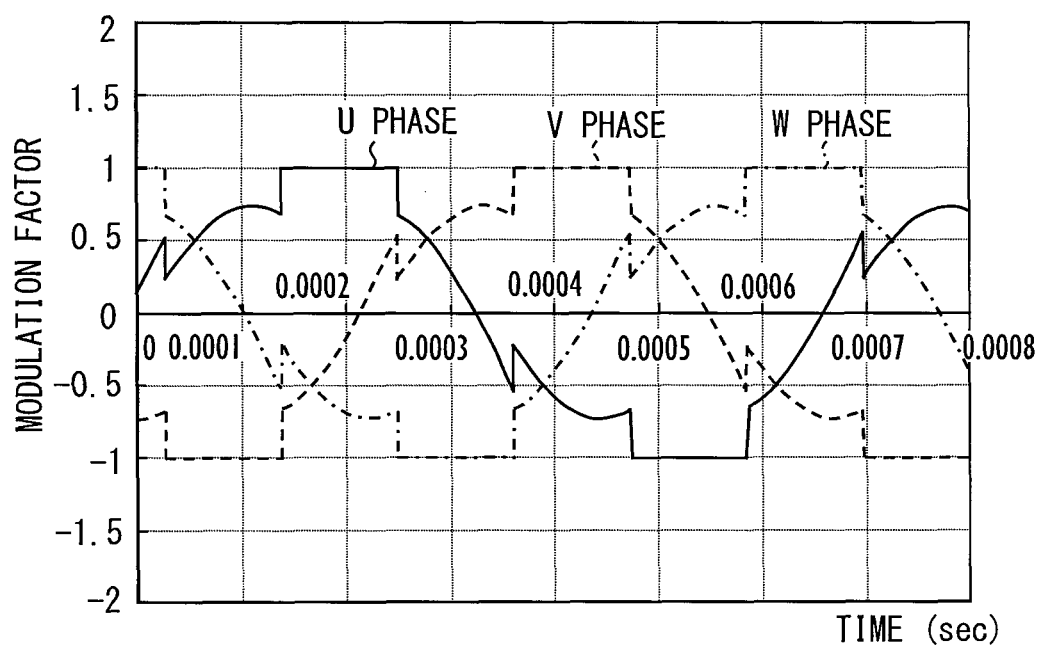
FIG. 10 is a graph showing another example of a modulation scheme other than the three-phase modulation scheme in another embodiment.

For example, as shown in FIG. 8, the other modulation scheme may be the two-phase modulation scheme with the lower fixation in which the on/off states of the switching elements of the three-phase arms are sequentially fixed to the lower arm side by 120 degrees in electrical angle. Alternatively, for example as shown in FIG. 9, the other modulation scheme may be the two-phase modulation scheme with the upper fixation in which the on/off states of the switching elements of the three-phase arms are sequentially fixed to the upper arm side by 120 degrees in electrical angle. Alternatively, for example shown in FIG. 10, the other modulation scheme may be the two-phase modulation scheme with the upper and lower fixation different from the first embodiment. The modulation scheme shown in FIG. 10 is the two-phase modulation scheme with the upper and lower fixation in synchronization with a current phase. Since there is a phase difference between a voltage waveform and a current waveform, the modulation factor waveform with each arm fixed in synchronization with the current phase is shown in FIG. 10. Alternatively, the other modulation scheme may be, for example, a rectangular wave modulation scheme.

While in the above embodiment the inverter circuit 40 is mounted on the outer surface of the end wall portion of the housing 1 within which the suctioned refrigerant circulates, the mounting of the inverter circuit is not limited thereto. For example, the inverter circuit may be mounted on the outer surface of the cylindrical portion of the housing 1. Alternatively, for example, the inverter circuit may be mounted on a position where the suctioned refrigerant circulates within the housing 1.

While in the above embodiment the inverter circuit 40 is cooled by the refrigerant suctioned by the compression mechanism 11, the cooling of the inverter circuit is not limited thereto. For example, heat from the inverter circuit may be dissipated into the atmosphere.

While in the above embodiment the motor drive device drives the motor whose load is the compression mechanism of the compressor disposed in the heat pump cycle of the vehicle air conditioner, the load is not limited thereto. The load driven by the motor may be, for example, a stationary compression mechanism, or may be a load other than the compression mechanism.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A motor drive device comprising:
an inverter circuit that has a switching element provided corresponding to each phase of a motor having a motor coil of three phases, converts a DC voltage into an AC voltage by a PWM modulation associated with a switching operation of the switching element, and outputs the AC voltage to the motor coil of each phase; and
a control device including a voltage/current detection unit that receives a current information signal and a voltage information signal, and converts the signals into a state quantity used for control computation and a position sensorless control unit that receives a compressor rotation number command from a higher-level control device and the state quantity from the voltage/current detection unit, and outputs control information for implementing motor rotation speed-current control in a position sensorless manner, wherein the control device controls the PWM modulation of the inverter circuit based on a control modulation factor value sampled at a predetermined period from a target modulation factor waveform determined in accordance with a target rotation number of the motor, and can selectively switch a scheme of the PWM modulation between a plurality of modulation schemes including a three-phase modulation scheme,
wherein when the control device determines, based on the sampling number in one period of the target modulation factor waveform or a correlation value of the sampling number, that the sampling number is less than a predetermined value in a case where a modulation scheme other than the three-phase modulation scheme is selected and the target rotation number increases, the control device switches the scheme of the PWM modulation from the other modulation scheme to the three-phase modulation scheme.

2. The motor drive device according to claim 1, wherein a load driven by the motor is a compression mechanism which suctions and compresses a refrigerant of a refrigeration cycle, and
the inverter circuit is cooled by the refrigerant suctioned by the compression mechanism.

3. The motor drive device according to claim 1, wherein the correlation value of the sampling number is a value corresponding to a pause duration which is a fixation duration of each phase arm.

4. The motor drive device according to claim 1, wherein the correlation value of the sampling number is a value corresponding to a waveform generation rate.

5. The motor drive device according to claim 1, wherein the correlation value of the sampling number is a value corresponding to a motor rotation number or a modulation factor.

6. The motor drive device according to claim 1, wherein the predetermined value is 18.

7. The motor drive device according to claim 1, wherein the control device further includes
a modulation scheme determination unit that receives the control information from the position sensorless control unit, determines a modulation scheme to be adopted among a plurality of modulation schemes in accordance with a motor rotation number or a modulation factor sampling number, and calculates a modulation signal based on the determined modulation scheme, and
a drive circuit unit that receives the modulation signal from the modulation scheme determination unit, and outputs a pulsed drive signal to the inverter circuit.

8. The motor drive device according to claim 7 further comprising:
a current detection device that detects current flowing through an output line of the inverter circuit; and
a voltage detection device that detects a voltage between buses extending from a DC power source to the inverter circuit, wherein
the current detection device outputs the current information signal, and
the voltage detection device outputs the voltage information signal.

* * * * *